United States Patent
Liang et al.

(10) Patent No.: US 12,120,605 B2
(45) Date of Patent: Oct. 15, 2024

(54) ACCESS POINT (AP) SELECTION IN SELF-ORGANIZING NETWORK

(71) Applicant: Wistron NeWeb Corporation, Hsinchu (TW)

(72) Inventors: Hao-Ming Liang, Hsinchu (TW); Chui-Chu Cheng, Hsinchu (TW); Chih-Wei Chung, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 319 days.

(21) Appl. No.: 17/723,416

(22) Filed: Apr. 18, 2022

(65) Prior Publication Data

US 2023/0014215 A1 Jan. 19, 2023

(30) Foreign Application Priority Data

Jul. 16, 2021 (TW) ................. 110126283

(51) Int. Cl.
*H04W 48/20* (2009.01)
*H04W 84/18* (2009.01)

(52) U.S. Cl.
CPC ............ *H04W 48/20* (2013.01); *H04W 84/18* (2013.01)

(58) Field of Classification Search
CPC ..... H04W 48/20; H04W 84/18; H04W 12/04; H04W 84/12
See application file for complete search history.

(56) References Cited

U.S. PATENT DOCUMENTS

| | | | | |
|---|---|---|---|---|
| 2010/0054179 | A1* | 3/2010 | Meyer | H04W 12/04 370/328 |
| 2013/0095789 | A1* | 4/2013 | Keevill | H04W 12/062 455/411 |
| 2016/0174265 | A1* | 6/2016 | Tofighbakhsh | H04L 65/80 370/338 |
| 2016/0295638 | A1* | 10/2016 | Allanki | H04W 48/20 |
| 2018/0213580 | A1 | 7/2018 | Taskin | |

FOREIGN PATENT DOCUMENTS

| | | |
|---|---|---|
| CN | 111885680 A | 11/2020 |
| CN | 112752354 A | 5/2021 |

* cited by examiner

*Primary Examiner* — Rushil P. Sampat
(74) *Attorney, Agent, or Firm* — Winston Hsu (57) ABSTRACT

A wireless communication method of a wireless communication device is disclosed, wherein the wireless communication method includes the steps of: establishing a link with a first access point, and obtaining a BSSID list of a plurality of access points of a self-organizing network from the first access point of the SON during a link process; determining at least one candidate access point from the plurality of access point according to the BSSID list; and selecting one of the at least one candidate access point to establish a link.

17 Claims, 8 Drawing Sheets

| Vendor extension field | Attribute length | OUI | Information type | Information length | BSSID list | ..... |

ACCESS POINT (AP) SELECTION IN SELF-ORGANIZING NETWORK

BACKGROUND OF THE INVENTION

1. Field of the Invention

The present invention relates to wireless communication, and more particularly, to a wireless communication device and a wireless communication method used in the wireless communication device.

2. Description of the Prior Art

In order to prevent the wireless communication quality from being affected by blind spot of the wireless network during users communicating with each other, the Self-Organizing Network (SON) was developed to connect various access points to make access points be automatically connected to each other and coordinate operations to expand network coverage.

The access points can be connected to each other through wired or wireless means, that is, Ethernet or Wi-Fi. When an access point uses the wireless means to connect to other access points, the access point needs to know basic service set identifiers (BSSIDs) of the other access points in order to select the best access point to connect. Under general circumstances, the access point can use the service set identifier (SSIDs) and passive scanning to find nearby access points to obtain the BSSIDs of other access points. However, due to certain security considerations, some access points in a self-organizing network may choose to hide their backhaul SSIDs, such that the access point cannot obtain the BSSIDs of other access points through passive scanning. In the case that passive scanning is not available, the access point may use an active scan method, that is, actively send a probe request and listen to probe responses from other access points. However, under the dynamic frequency selection (DFS) channels, relevant regulations do not allow access points to use active scanning, thereby preventing radar operations from interference.

Therefore, in the situation where the access points in the self-organizing network mentioned above use the DFS channels and hide the backhaul SSIDs thereof, one access point that wants to join the self-organizing network cannot automatically obtain the BSSIDs of other access points in the self-organizing network, which causes inconvenience to users.

SUMMARY OF THE INVENTION

One of the objectives of the present invention is to provide a wireless communication method and a related wireless communication device, which can automatically obtain the BSSIDs of other access points to select an appropriate access point for connection, to solve problems of the prior art.

An embodiment of the present invention discloses a wireless communication method used in a wireless communication device. The wireless communication method includes: establishing a link with a first access point, and obtaining a basic service set identifier (BSSID) list of multiple access points of a self-organizing network (SON) from the first access point of the SON during a link process; determining at least one candidate access point from the multiple access points according to the BSSID list; and selecting one of said at least one candidate access point to establish a link.

An embodiment of the present invention further discloses a wireless communication device including a wireless network module and a processor. The processor establishes a link with a first access point through the wireless network module, and obtains a basic service set identifier (BSSID) list of multiple access points of a self-organizing network (SON) from the first access point of the SON during a link process. The processor determines at least one candidate access point from the multiple access points according to the BSSID list, and selects one of said at least one candidate access point to establish a link.

An embodiment of the present invention discloses a wireless communication method used in a wireless communication device. The wireless communication device communicates with multiple access points in a self-organizing network (SON). The wireless communication method includes: establishing a link with a first access point, and sending a basic service set identifier (BSSID) list of the multiple access points of the SON to the first access point during a link process;

An embodiment of the present invention further discloses a wireless communication device including a wireless network module and a processor. The wireless communication device communicates with multiple access points in a self-organizing network (SON), and the processor establishes a link with a first access point through the wireless network module, and sends a basic service set identifier (BSSID) list of multiple access points of the SON to the first access point during a link process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
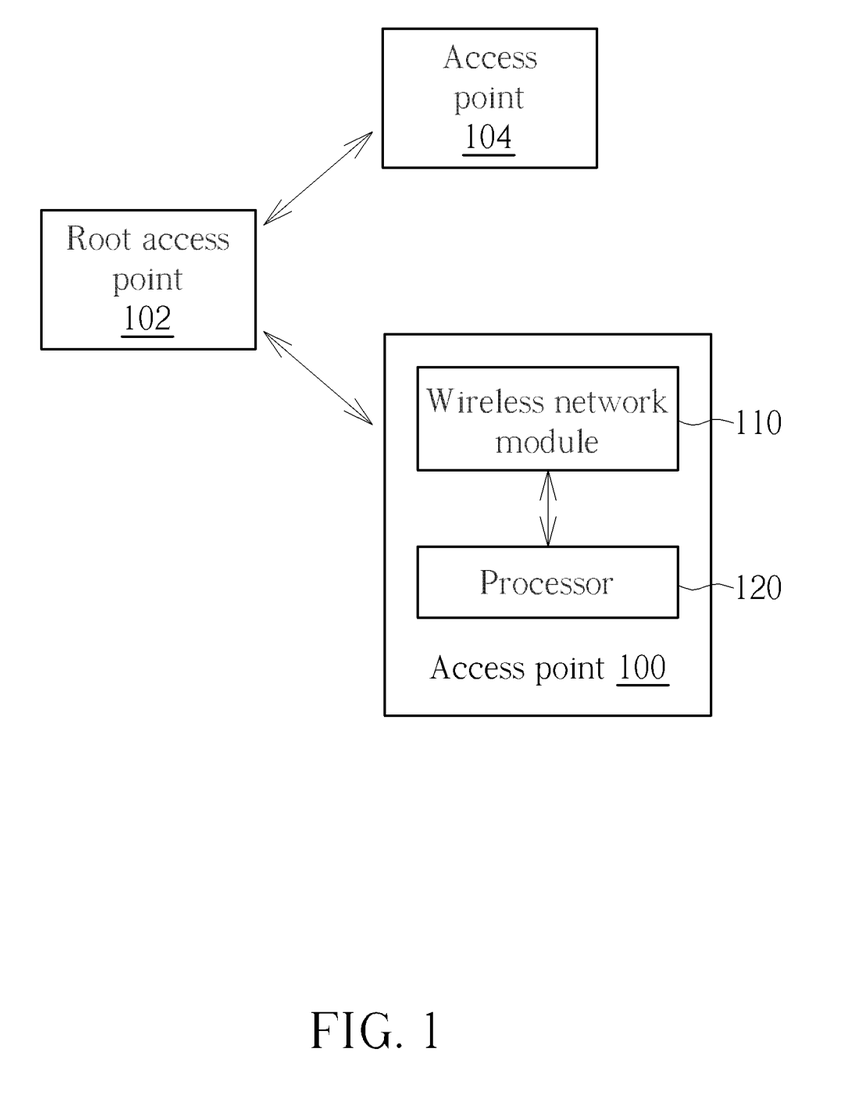
FIG. 1 is a diagram illustrating a wireless communication system according to an embodiment of the present invention.

FIG. 1 is a diagram illustrating a wireless communication system according to an embodiment of the present invention. As shown in FIG. 1, the wireless communication system includes a plurality of wireless communication devices that can be connected to each other. In the present embodiment, the plurality of wireless communication devices are access points 100, 104, and a root access point 102. Take the access point 100 as an example. Each access point includes a wireless network module 110 and a processor 120, wherein the wireless network module 110 includes an antenna and a related front-end circuit, and the processor 120 is configured for performing wireless communication with other electronic devices through the wireless network module 110. In the following description, the operations performed by the access point 100 are performed by the processor 120 or performed by the processor 120 through the wireless network module 110.

In the present embodiment, the wireless communication system includes a self-organizing network (SON), and the self-organizing network is a network with a specific topology centered on the root access point 102, such as a star network shown in FIG. 1 with the root access point 102 as the center. However, in other embodiments, the self-organizing network can also be a Daisy chain network or a tree network. In the self-organizing network, each access point has the same fronthaul SSID that is used by external terminal devices (e.g., mobile phones and laptops) to connect to the wireless network, and the wireless communication between the terminal device and the access point is carried out in the 2.4 GHz (gigahertz) band, the 5 GHz or 6 GHz band; in addition, each access point also has the same backhaul SSID for allowing access points to communicate with each other, and the wireless communication between the access points is carried out in the 5 GHz or 6 GHz band in general.

When a new access point, such as the access point 100, is going to join the self-organizing network centered on the root access point 102 and select a most appropriate access point to connect, the backhaul SSID of the self-organizing network and the BSSID of each access point are required, where the BSSID can include a media access control (MAC) address. However, when the backhaul wireless communication of the self-organizing network is operated on dynamic frequency selection (DFS) channels and the access of the self-organizing network uses a security mechanism that hides the SSID, the access point 100 cannot send a probe request to obtain the BSSIDs of other access points due to Wi-Fi regulations, and the beacons sent from other access points (e.g., the access point 104 and the root access point 102) do not carry the backhaul SSID. Therefore, the present embodiment proposes a new connection method in which a new access point can connect to the self-organizing network through the Wi-Fi Protected Setup (WPS) mechanism or Ethernet and can further obtain the BSSIDs of all other access points. In the present embodiment, it is assumed that the self-organizing network originally comprises the root access point 102 and the access point 104, and the access point 100 is ready to establish a link with the root access point 102 to join the self-organizing network.

Figure 2:
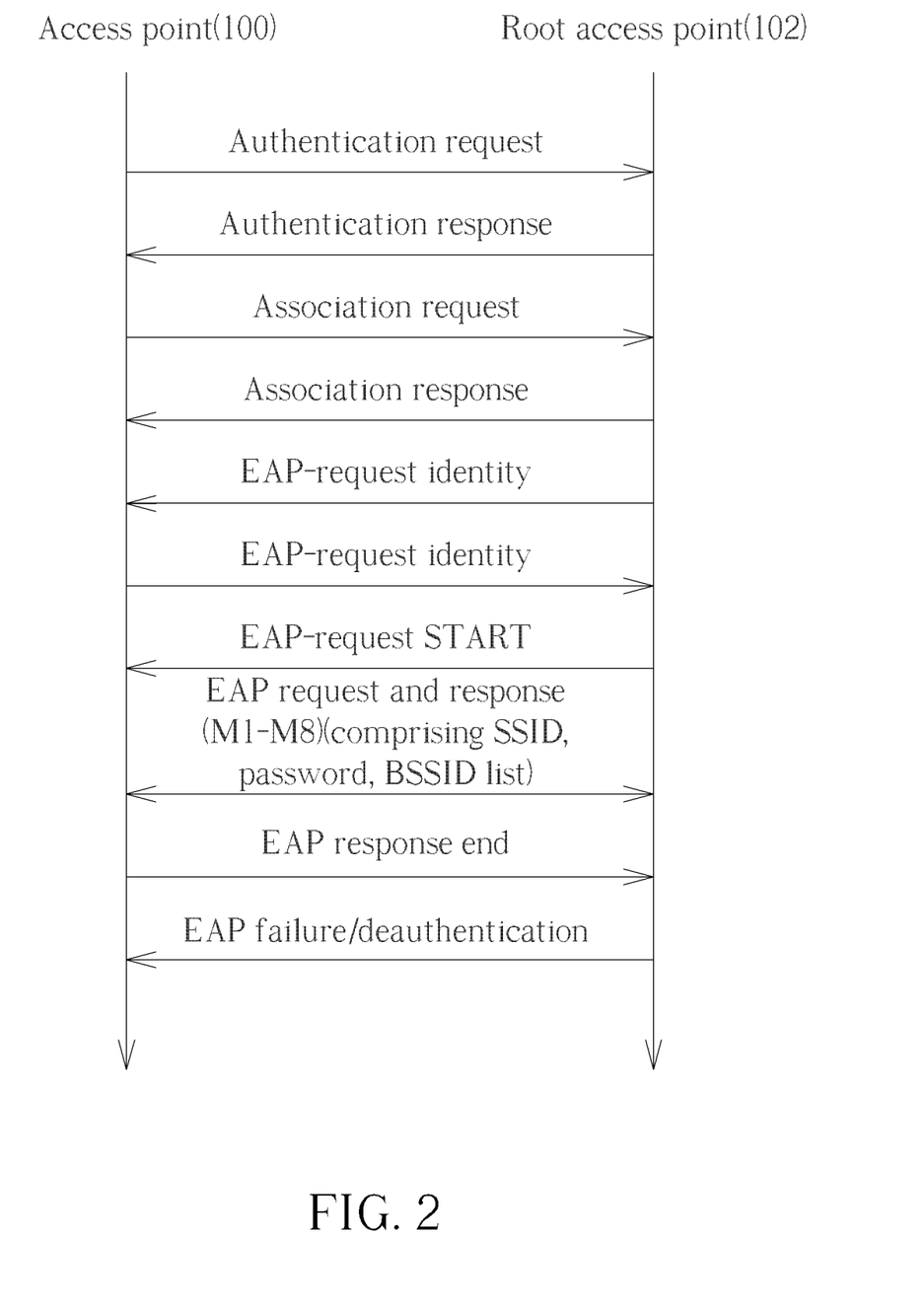
FIG. 2 is a diagram illustrating an access point establishing a link with a root access point through a WPS mechanism according to an embodiment of the present invention.

Please refer to FIG. 2, which is a diagram illustrating the access point 100 establishing a link with the root access point 102 through a WPS mechanism according to an embodiment of the present invention. As shown in FIG. 2, the access point 100 first sends an authentication request to the root access point 102 to request an authentication process, and the root access point 102 generates an authentication response to indicate the authentication success or the authentication failure after receiving the authentication request. In the present embodiment, it is assumed that the authentication is successful. Then, the access point 100 sends an association request to the root access point 102, and the root access point 102 generates an association response after receiving the association request. Then, the access point 100 and the root access point 102 mutually send an extensible authentication protocol (EAP)-request identity to each other, and the root access point 102 sends a message of an EAP-request START to the access point after that. Then, in the process of the request and response of EAP, the root access point 102 will send multiple messages to the access point 100 to inform the backhaul SSID of the self-organizing network, the connection password, and the BSSID list of all access points in the self-organizing network. In the present embodiment, since the current self-organizing network includes only the root access point 102 and the access point 104, the BSSID list includes only the BSSIDs of both the root access point 102 and the access point 104. In some embodiments, during the process of the request and response of EAP, the root access point 102 sends multiple messages M1-M8 defined by the WPS mechanism to the access point 100, and the root access point 102 can write the BSSID list into the extendable fields in the messages M1-M8 (e.g., a vendor extension field of the message M2 or the message M8). Finally, the EAP response end, and the access point 100 gets EAP failure and deauthentication.

It should be noted that in the flow of FIG. 2, the key feature of the present embodiment is that during the process of the request and response of EAP, the root access point 102 sends multiple messages to the access point 100 to inform a BSSID list of all access points in the self-organizing network. Since the original contents of the request/response of authentication, the request/response of association, and the messages M1-M8 are known to those skilled in the art, further description is omitted here for simplicity.

Figure 3:
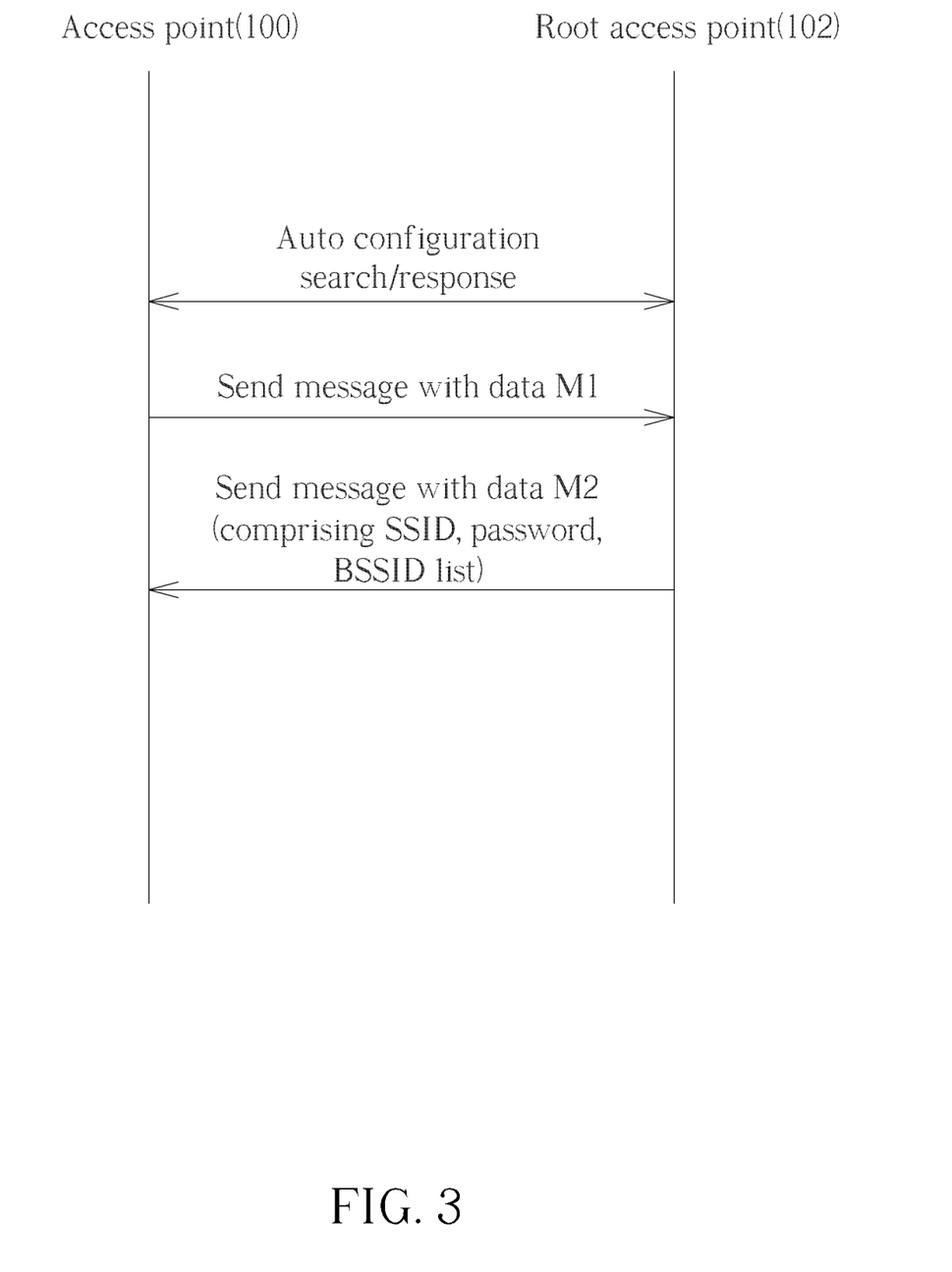
FIG. 3 is a diagram illustrating the access point establishing a link with the root access point through Ethernet according to an embodiment of the present invention.

Please refer to FIG. 3, which is a diagram illustrating the access point 100 establishing a link with the root access point 102 through a wired network (e.g., Ethernet, a coaxial cable, or a power line) or a wireless network according to an embodiment of the present invention. In the present embodiment, the access point 100 is implemented through the onboarding standard of EasyMesh network established by the Wi-Fi Alliance. As shown in FIG. 3, the access point 100 and root access point 102 first perform auto configuration search/response. Then, the access point 100 sends a message, such as an EasyMesh AP autoconfiguration WSC message that is defined in the relevant specification and carries one of the data M1-M2 (hereinafter referred to as a message with data M1/M2). In the present embodiment, the access point 100 sends a message with the data M1 to the root access point 102, and after receiving the message with the data M1, the root access point 102 sends a message with the data M2 and the backhaul SSID of the self-organizing network, the connection password, and the BSSID list of all the access points in the self-organizing network to the access point 100. In some embodiments, the root access point 102 can write the BSSID list into an extendable field in the message with the data M2, such as a vendor extension field.

Figure 4:
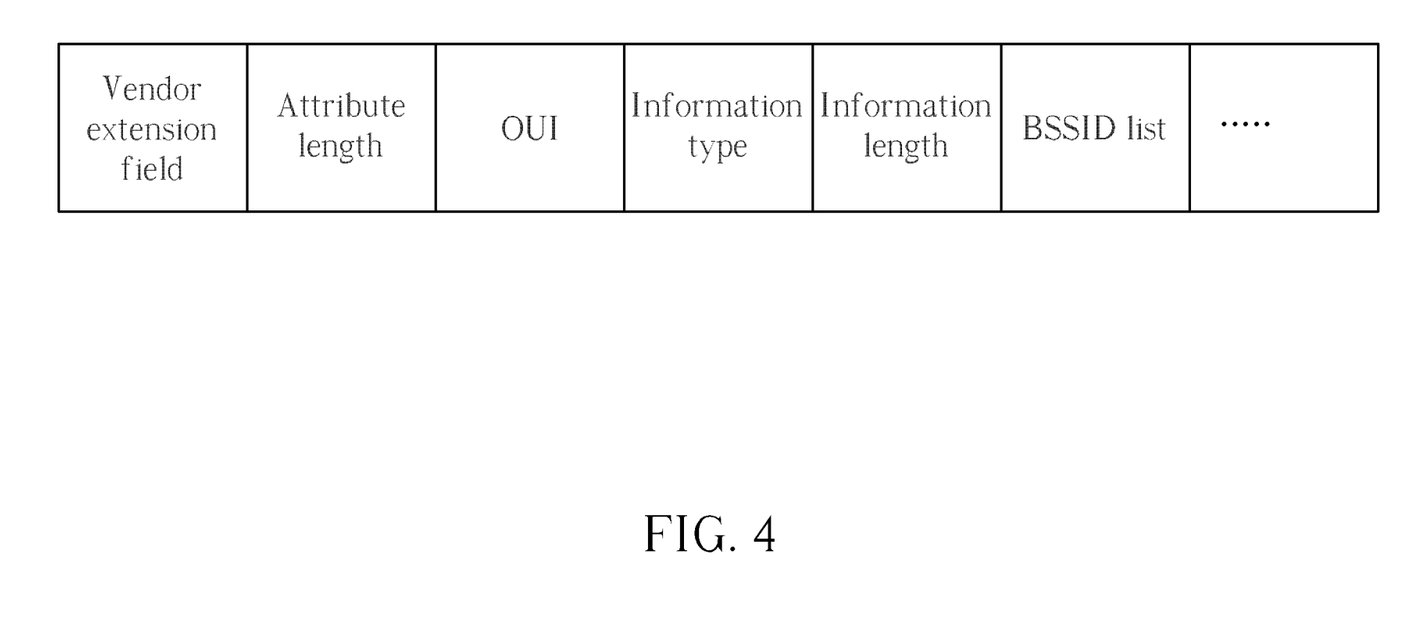
FIG. 4 is a diagram illustrating a BSSID list being carried by using a vendor extension field according to an embodiment of the present invention.

It should be noted that, in the process shown in FIG. 3, the key feature of the present embodiment is that during the message transmission process, the root access point 102 sends the BSSID list to the access point 100 through the message. Since the original contents of the search/response of autoconfiguration and the messages with the data M1/M2 are known to those skilled in the art, further description is omitted here for simplicity FIG. 4 is a diagram illustrating a BSSID list being carried by using a vendor extension field according to an embodiment of the present invention. In the relevant specifications of the WPS mechanism, the vendor extension field can be extended to a maximum of 1024 bytes. In FIG. 4, the vendor extension field shown in the figure can be 2 bytes, and the following attribute length and organizationally unique identifier (OUI) are 2 bytes and 3 bytes, respectively. In the present embodiment, the relevant information of the BSSID list can be directly arranged after the OUI, such as the information type, information length and BSSID list shown in the figure, where the information type is used to indicate the content carried in the subsequent fields, and the information length is the length of the BSSID list, and the BSSID list includes the BSSIDs of the root access point 102 and the access point 104.

Figure 5:
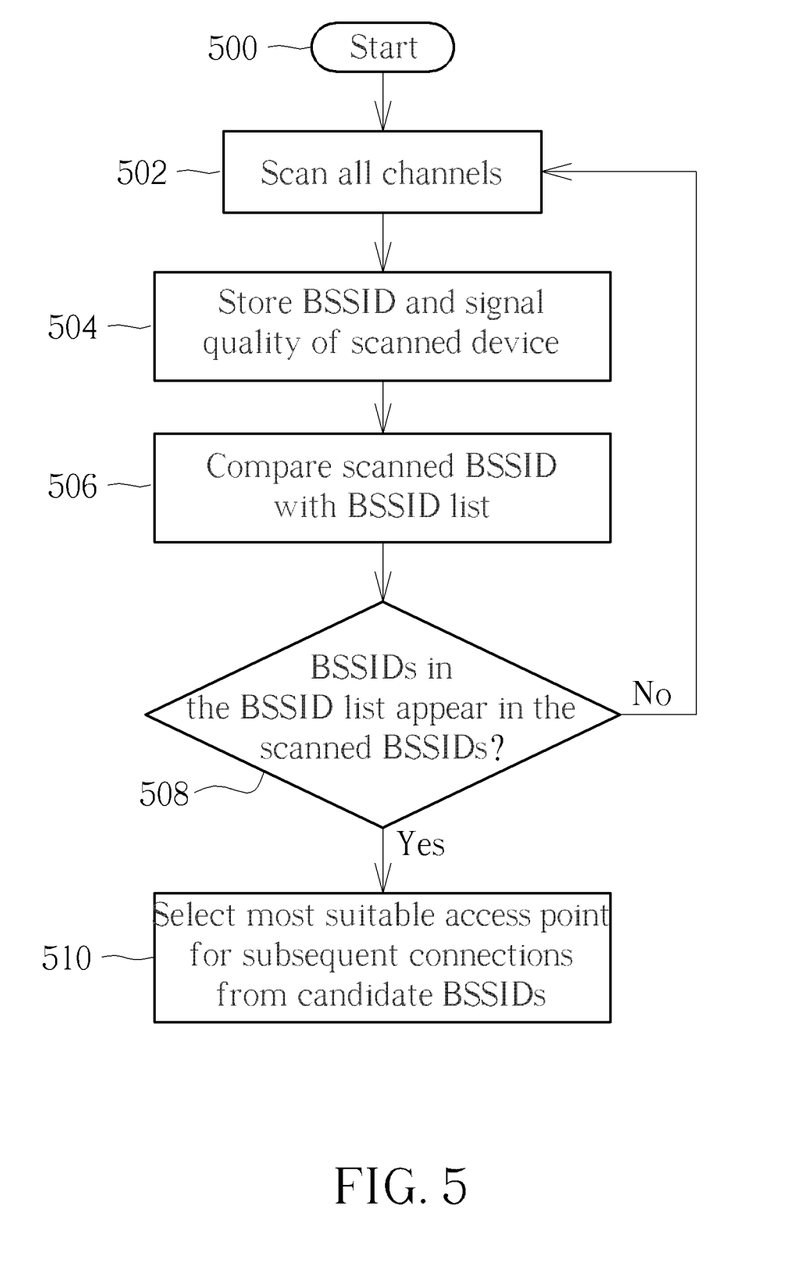
FIG. 5 is a flowchart illustrating the access point determining the most suitable access point for connection.

After the access point 100 completes establishing the link with the root access point 102 and obtains the BSSID list of the self-organizing network, the access point 100 can select a most suitable access point according to the content of the BSSID list. In one example, assuming that the self-organizing network is not using any DFS channel, the access point 100 can use an active scan method, that is, actively send a probe request to request responses from other access points, and an access point suitable for connection is determined according to the signal strength or signal quality of the other access points. At this moment, if it is determined that the currently linked root access point 102 is the best access point, then the access point 100 maintains the link with the root access point 102; and if it is determined that the access point 104 is the best access point, the access point 100 disconnects from the root access point 102 at a suitable time point, and starts to establish a link with the access point 104. In another example, assuming that the self-organizing network uses the DFS channels, and each of the root access point 102 and the access point 104 in the self-organizing network uses a hidden SSID mode (that is, the beacons sent by the root access point 102 and the access point 104 do not carry the backhaul SSID), then the access point 100 can passively listen to the beacons sent by other access points, and then compare the beacons with the BSSID list to determine the most suitable access point for connection. Specifically, please refer to the flowchart in FIG. 5 that illustrates how the access point 100 determines the most suitable access point for connection. In step 500, the flow starts. In step 502, the access point 100 scans all channels by receiving beacons. In step 504, the access point 100 stores the BSSID and signal quality of any scanned device, where the signal quality can be the received signal strength indication (RSSI) which can be measured without connection. Then, in step 506, the access point 100 compares the scanned BSSID with the BSSID list previously obtained from the root access point 102. For example, assuming that the access point 100 scans 50 BSSIDs in step 502 and the BSSID list obtained from the root access point 102 contains only the BSSIDs of the root access point 102 and the access point 104, the access point 100 determines whether the BSSIDs of the root access point 102 and the access point 104 appear in the scanned 50 BSSIDs. In step 508, the access point 100 determines whether BSSIDs in the BSSID list appear in the scanned BSSIDs. If Yes, the flow proceeds with step 510; if No, the flow proceeds with step 502. For example, if the BSSIDs of the root access point 102 and the access point 104 in the BSSID list appear in the scanned 50 BSSIDs, the BSSIDs of the root access point 102 and the access point 104 are candidate access points. In step 510, the access point 100 determines a most suitable access point for subsequent connections according to the signal quality of all candidate access points.

According to the above arrangement, through the method proposed in the present embodiment, the access point 100 can establish a link with a self-organizing network using DFS channels and hidden SSID mode, and automatically determines the most suitable access point for connection. Therefore, it is convenient for users to operate, and the connection quality can be better.

Figure 6:
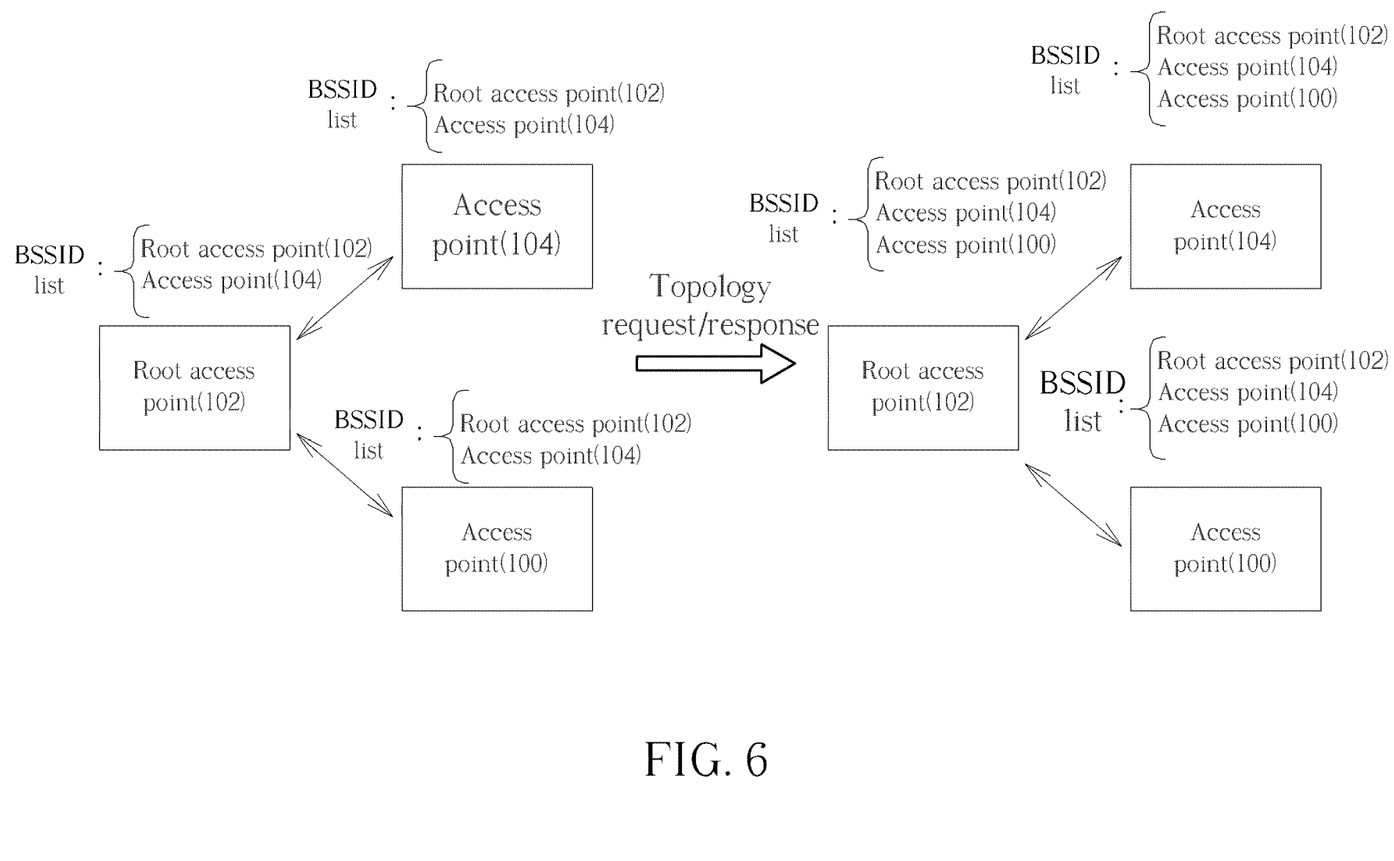
FIG. 6 is a diagram illustrating using topology request/response to update the BBSID list according to an embodiment of the present invention.

In the above embodiment, the BSSID list includes only the BSSIDs of the root access point 102 and the access point 104. At this moment, since the BSSID of the access point 100 is not added to the BSSID list yet, the BSSID list contained in all the access points in the self-organizing network has only the BSSIDs of the root access point 102 and the access point 104, and lacks the BSSID of the access point 100. In the subsequent connection of the self-organizing network, the EasyMesh network standard defines the topology information exchange whose purpose is to let all access points in the self-organizing network know the interface information of other access points and connected devices of other access points. For example, the root access point 102 can send a topology request, and after receiving the topology request, each of the access points 100 and 104 sends a topology response to transmit current information of itself (e.g., backhaul SSID, fronthaul SSID, BSSID, etc.), and also sends another topology request; in addition, after receiving the topology response, each access point can determine whether a device belongs to its own self-organizing network according to the information of the device (e.g., the backhaul SSID and BSSID) in the topology response, and update its own BSSID list accordingly. In summary, with the use of periodical topology requests/responses, after each access point in the self-organizing network sends a topology response, each access point in the self-organizing network can obtain the BSSID of each access point. Taking the embodiment in FIG. 6 as an illustration, after the topology request/response process is done, the root access point 102 and the access points 100 and 104 have the same BSSID list, that is, the BSSID list includes the BSSID of the root access point 102 and the access points 100 and 104.

Figure 7:
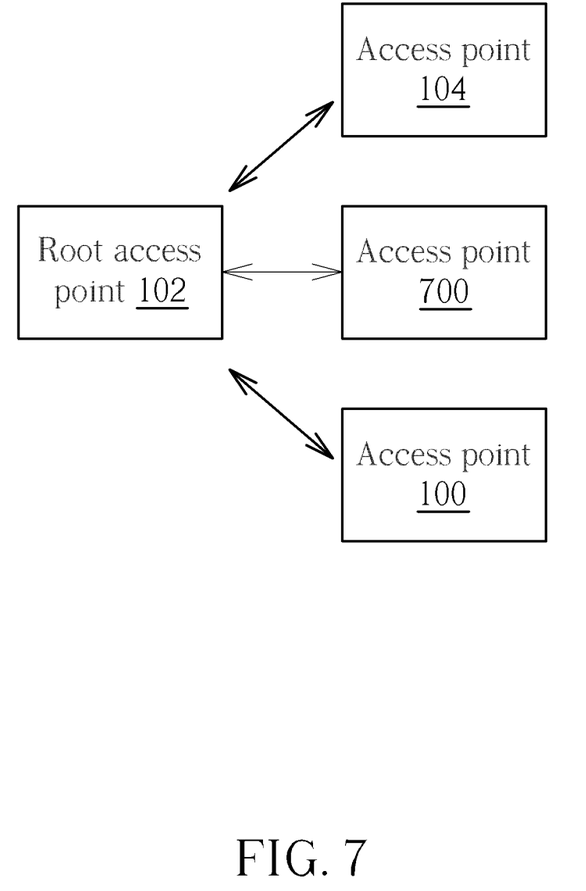
FIG. 7 is a diagram illustrating a new access point being added to the self-organizing network according to an embodiment of the present invention.
Figure 8:
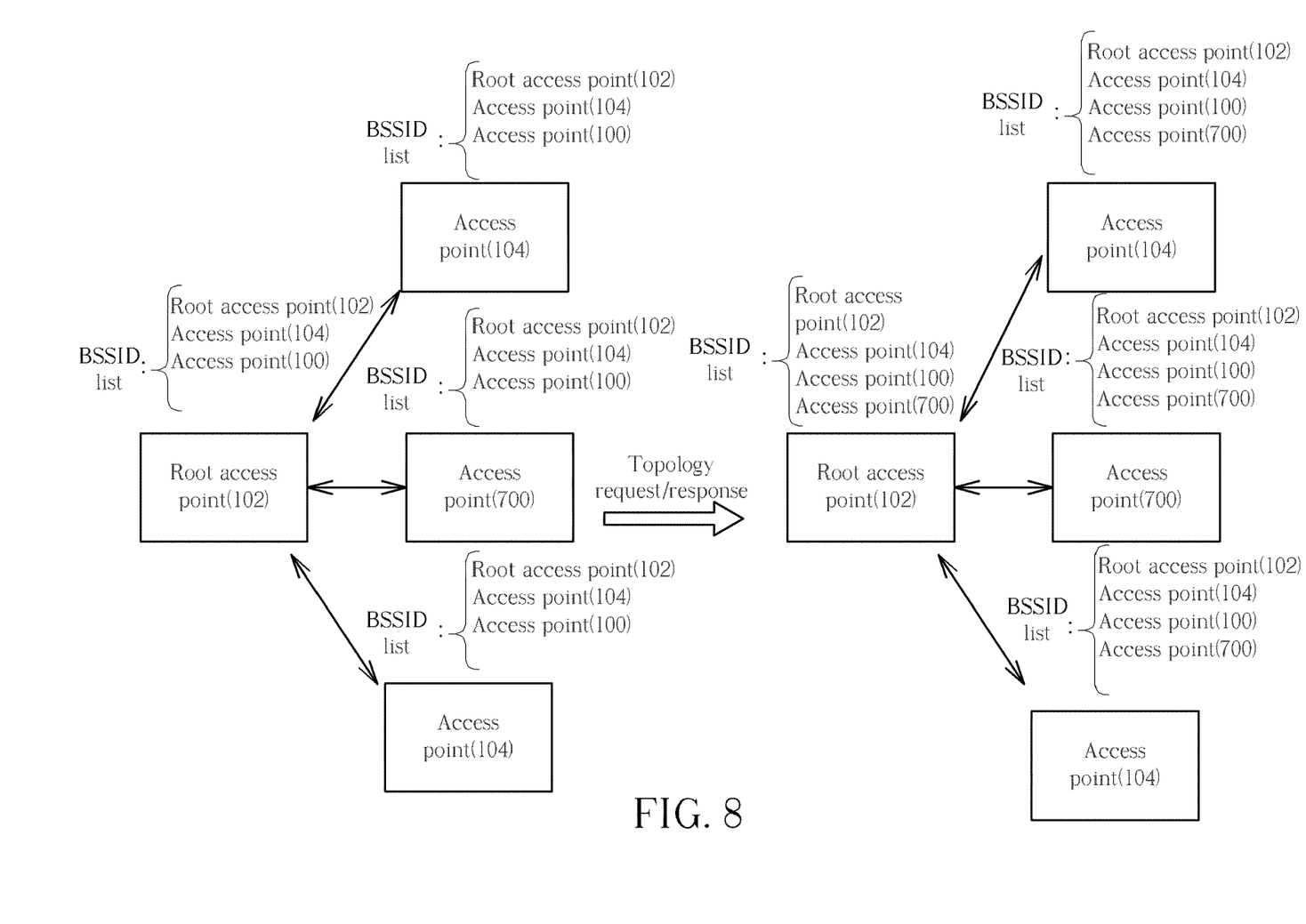
FIG. 8 is a diagram illustrating using a request/response of topology to update the BBSID list according to another embodiment of the present invention.

According to the above arrangement, since each access point in the self-organizing network will have a complete BSSID list after the topology request/response process, if there is other access point that wants to join the self-organizing network in the future, the access point can obtain the current BSSID list when establishing a link with any of the root access point 102 and the access points 100 and 104, to select a suitable access point for connection. Specifically, please refer to FIG. 7. Assuming that the current self-organizing network includes the root access point 102 and access points 100 and 104, and the access point 700 can obtain the backhaul SSID and the BSSID list from the root access point 102 through the WPS mechanism or the Ethernet as described in the embodiments in FIG. 2 and FIG. 3, and then use the flow in FIG. 5 to determine the most suitable access point in the self-organizing network for subsequent connections. In addition, the BSSID list obtained by the access point 700 contains only the BSSIDs of the root access point 102 and the access points 100 and 104. After each access point in the self-organizing network sends a topology response during a periodical topology request/response process, the root access point 102 and the access points 100, 104 and 700 have the same BSSID list, that is, the BSSID list includes the BSSIDs of the root access point 102 and the access points 100, 104 and 700, as shown in FIG. 8. It should be noted that, in the above embodiments, the newly added access point has to initially establish a link with the root access point 102 and obtains the BSSID list, but this feature is not a limitation of the present invention. In some other embodiments, the access point 100 can join the self-organizing network by establishing a link with the access point 104, and at this time, the access point 100 obtains the BSSID list from the access point 104; and the access point 700 can also join the self-organizing network by establishing a link with the access point 100 or the access point 104, and at this time, the access point 100 obtains the BSSID list from the access point 100 or the access point 104.

Summarizing the present invention briefly, in the wireless communication method of the present invention and its related wireless communication device, when a new access point is ready to join the self-organizing network, the access point connected to the new access point in the self-organizing network can automatically send the BSSID list of other access points in the self-organizing network to the new access point, thereby allowing the new access point to find the most suitable access point for subsequent connections. The present invention is particularly applicable to the situation where DFS channels are used in the self-organizing network and each access point in the self-organizing network uses the hidden SSID mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method used in a wireless communication device, comprising:
   establishing a link with a first access point, and obtaining a basic service set identifier (BSSID) list of multiple access points of a self-organizing network (SON) from the first access point of the SON during a link process, wherein the BSSID list comprises multiple BSSIDs respectively corresponding to the multiple access points, and each BSSID comprises a media access control (MAC) address of the corresponding access point;
   determining at least one candidate access point from the multiple access points according to the BSSID list; and
   selecting one of said at least one candidate access point to establish a link.

2. The wireless communication method of claim 1, wherein the step of establishing the link with the first access point, and obtaining the BSSID list of the multiple access points of the SON from the first access point of the SON during the link process comprises:
   establishing the link with the first access point through a Wi-Fi protected setup (WPS) mechanism, and during the link process, obtaining the BSSID list of the multiple access points of the SON through messages of request and response of extensible authentication protocol (EAP)-request identity.

3. The wireless communication method of claim 2, wherein the step of establishing the link with the first access point through the WPS mechanism, and during the link process, obtaining the BSSID list of the multiple access points of the SON through the messages of request and response of EAP-request identity comprises:
   establishing the link with the first access point through the WPS mechanism; and
   during the link process, obtaining the BSSID list of the multiple access points of the SON through a vendor extension field of the messages of request and response of EAP-request identity.

4. The wireless communication method of claim 1, wherein the step of establishing the link with the first access point, and obtaining the BSSID list of the multiple access points of the SON from the first access point of the SON during the link process comprises:
   establishing the link with the first access point through a wired network or a wireless network, and during the link process, obtaining the BSSID list of the multiple access points of the SON through a message of an EasyMesh network onboarding standard.

5. The wireless communication method of claim 4, wherein the step of establishing the link with the first access point through the wired network or the wireless network, and during the link process, obtaining the BSSID list of the multiple access points of the SON through the message of the EasyMesh network onboarding standard comprises:
   establish the link with the first access point through the wired network or the wireless network; and
   during the link process, obtaining the BSSID list of the multiple access points of the SON through a vendor extension field of the message of the EasyMesh network onboarding standard.

6. The wireless communication method of claim 1, further comprising:
   receiving a topology request conforming to an EasyMesh network from the first access point;
   after receiving the topology request, sending a topology response to transmit information of itself, and
   sending another topology request and receiving topology responses from other access points in the SON that include information of the other access points, and updating the BSSID list accordingly.

7. The wireless communication method of claim 1, wherein the step of determining said at least one candidate access point from the multiple access points according to the BSSID list comprises:
   scanning multiple channels to get multiple scanned BSSIDs;
   determining whether BSSIDs in the BSSID list appear in the multiple scanned BSSIDs; and
   determining said at least one candidate access point from the BSSIDs of the BSSID list that appear in the multiple scanned BSSIDs.

8. The wireless communication method of claim 7, wherein the SON uses dynamic frequency selection (DFS) channels for communication, and uses a hidden service set identifier (SSID) mode; and the step of scanning the multiple channels to get the multiple scanned BSSIDs comprises:
   passively listening to beacons of the multiple channels to obtain the multiple scanned BSSIDs.

9. The wireless communication method of claim 1, further comprising:
   saving the BSSID list; and
   receiving messages with BSSIDs from at least a portion of the multiple access points in the SON to update the BSSID list.

10. A wireless communication method used in a wireless communication device, wherein the wireless communication device communicates with multiple access points in a self-organizing network (SON); the wireless communication method comprising:
   establishing a link with a first access point, and sending a basic service set identifier (BSSID) list of the multiple access points of the SON to the first access point during a link process, wherein the BSSID list comprises multiple BSSIDs respectively corresponding to the multiple access points, and each BSSID comprises a media access control (MAC) address of the corresponding access point.

11. The wireless communication method of claim 10, wherein the step of establishing the link with the first access point, and sending the BSSID list of the multiple access points of the SON to the first access point during the link process comprises:
    establishing the link with the first access point through a Wi-Fi protected setup (WPS) mechanism, and during the link process, sending the BSSID list of the multiple access points of the SON to the first access point through messages of request and response of extensible authentication protocol (EAP)-request identity.

12. The wireless communication method of claim 11, wherein the step of establishing the link with the first access point through the WPS mechanism, and during the link process, sending the BSSID list of the multiple access points of the SON to the first access point through the messages of request and response of EAP-request identity comprises:
    establishing the link with the first access point through the WPS mechanism; and
    during the link process, sending the BSSID list of the multiple access points of the SON to the first access point through a vendor extension field of the messages of request and response of EAP-request identity.

13. The wireless communication method of claim 10, wherein the step of establishing the link with the first access point, and sending the BSSID list of the multiple access points of the SON to the first access point during the link process comprises:
    establishing the link with the first access point through a wired network or a wireless network, and during the link process, sending the BSSID list of the multiple access points of the SON to the first access point through a message of an EasyMesh network onboarding standard.

14. The wireless communication method of claim 13, wherein the step of establishing the link with the first access point through the wired network or the wireless network, and during the link process, sending the BSSID list of the multiple access points of the SON to the first access point through the message of the EasyMesh network onboarding standard comprises:
    establishing the link with the first access point through the wired network or the wireless network; and
    during the link process, sending the BSSID list of the multiple access points of the SON to the first access point through a vendor extension field of the message of the EasyMesh network onboarding standard.

15. The wireless communication method of claim 10, further comprising:
    receiving a topology request conforming to an EasyMesh network from the first access point;
    after receiving the topology request, sending a topology response to transmit information of itself; and
    sending another topology request and receiving topology responses from other access points in the SON that include information of the other access points, and updating the BSSID list accordingly.

16. The wireless communication method of claim 10, wherein the SON uses dynamic frequency selection (DFS) channels for communication, and uses a hidden service set identifier (SSID) mode.

17. A wireless communication device, comprising:
    a wireless network circuit; and
    a processor;
    wherein when the wireless communication device is to join a self-organizing network (SON), the processor establishes a link with a first access point through the wireless network circuit, and obtains a basic service set identifier (BSSID) list of multiple access points of the SON from the first access point of the SON during a link process, wherein the BSSID list comprises multiple BSSIDs respectively corresponding to the multiple access points, and each BSSID comprises a media access control (MAC) address of the corresponding access point; and the processor determines at least one candidate access point from the multiple access points according to the BSSID list, and selects one of said at least one candidate access point to establish a link; or
    wherein when the wireless communication device communicates with multiple access points in the SON, the processor establishes the link with the first access point through the wireless network circuit, and sends the BSSID list of the multiple access points of the SON to the first access point during the link process.

* * * * *